Patented May 1, 1945

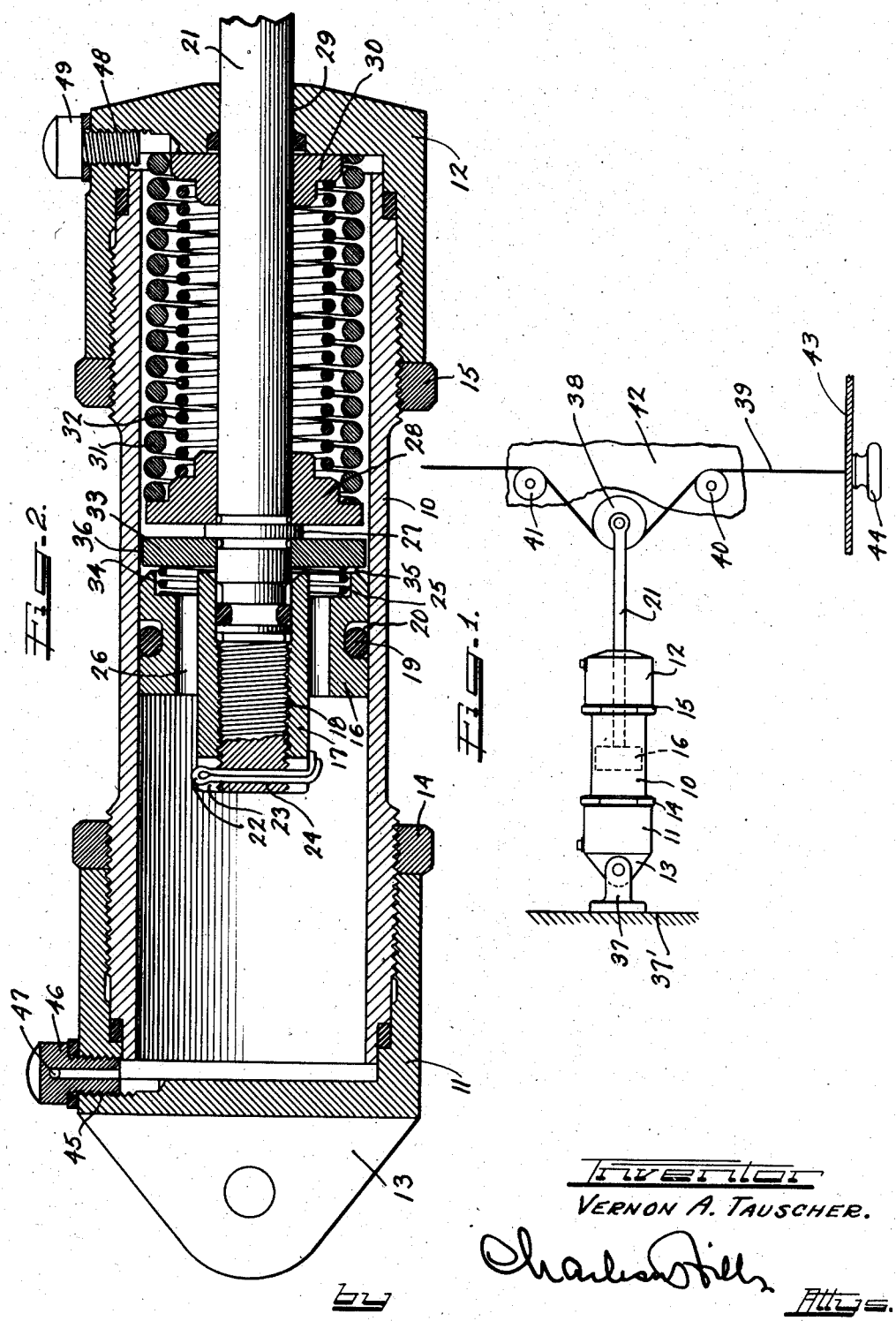

2,375,050

UNITED STATES PATENT OFFICE 2,375,050

CABLE TENSION REGULATOR

Vernon A. Tauscher, Inglewood, Calif.

Application August 25, 1943, Serial No. 500,022

6 Claims. (Cl. 267—1)

My invention relates to cable tension regulators for maintaining predetermined tension in cables to compensate for changes in cable length under temperature variation while the cables are idle, but which are hydraulically locked out when the cables are operated for setting of some control element.

My invention may be efficiently utilized where cables are comparatively long and extend through structures the coefficient of expansion of which is materially different from that of the cables. My invention is particularly useful in aircraft structures where cables extend from control devices in the cockpit through the fuselage or wings to flying control elements to be operated.

An important object of the invention is to provide a hydraulically controlled tension regulator for association with cables comprising a cylinder with a piston therein engaged by a spring so that tension will be exerted on a cable to be controlled and associated with the end of the piston rod extending from the piston, and with improved valving mechanism associated with the piston structure for control of the flow from one side of the piston to the other.

Another object of the invention is to provide improved valving mechanism controlled entirely hydraulically by the fluid within the cylinder, with the operation such that, when the cable is idle, the flow passageway will permit the piston to move comparatively slowly back and forth under varying temperature conditions to maintain the spring tension on the cable, but with substantially instantaneous response of the valve structure to fluid pressure to shut off the flow passageway when the cable is operated for setting of a control member in order that, during such operation of the cable, the piston will be kept hydraulically locked against outward movement in the cylinder.

The structure shown on the accompanying drawing embodies the various features of my invention, and on the drawing:

Figure 1 is a more or less diagrammatic illustration of one manner of application of a tension regulator for control of a cable; and Figure 2 is a longitudinal section of the regulator.

Referring to Figure 2, the tension regulator comprises a cylinder body 10 having heads in the form of caps 11 and 12 secured to the ends thereof as by threading, the head 11 being provided with ears 13 for attachment of the cylinder structure to a suitable support. After application of the caps, they are rigidly held in place as by lock nuts 14 and 15.

Within the cylinder is the piston 16 having a cylindrical concentric extension 17 on its inner side, the axial bore 18 extending through the piston and its extension. The piston has bearing fit in the cylinder, and to insure against any leakage between the piston and the cylinder, a suitable packing ring 19 is provided in the circumferential groove 20 in the piston.

In its inner portion, the bore 18 of the piston has threading for receiving the threaded inner end of the piston rod 21. The piston is thus adjustable on the rod and may be held in set position as by means of a cotter pin 22 extending through slots 23 in the extension 17 and a hole 24 through the piston rod. In its outer side the piston has the annular channel 25 and from this channel one or more ports 26 extend through the piston.

Adjacent to the outer side of the piston, the piston rod has an annular flange 27 against which seats the stepped abutment collar 28 surrounding the rod. The piston rod at its outer end extends through the passageway 29 in the cap 12, a collar 30 surrounding the rod and seating against the cap 12. An outer compression spring 31 abuts at its inner end against the outer step of the abutment collar 28, and at its outer end abuts the cap 12. An inner spring 32 abuts at its inner end against the upper step of the collar 28 and against the step on the collar 30, this spring assembly tending to shift the piston inwardly.

Between the flange 27 on the piston rod and the outer side of the piston 16, a cylindrical valve disk 33 is axially movable on the rod. Within the channel 25 in the piston is located a compression spring 34 which tends to hold the valve disk seated against the flange 27 to leave only a restricted annular flow passageway or gap 35 between the valve disk and the piston. The outer diameter of the valve disk 33 is such that only a restricted annular flow passageway or gap 36 will be retained between the valve disk and the cylinder wall, such passageway being something like one or two hundredths of an inch in radial extent. When the valve disk is shifted inwardly against the outer face of the piston, the flow passageway 35 will be closed. The cylinder is filled with fluid such as oil, and during comparatively slow movement of the piston, the displaced oil may flow from one side of the piston to the other through the flow gaps 35 and 36. However, when the piston is moved out more rapidly, the oil flow through these resistance gaps from the outer end of the cylinder to the inner end thereof is not fast enough, and pressure will quickly build up in the outer end of the cylinder which will act against the outer side of the valve disk to shift it into seating engagement with the piston, and then further outward movement of the piston will be hydraulically locked.

According to Figure 1, one manner of connecting the tension regulator in service is more or less diagrammatically illustrated. By its ears 13 the cylinder is fulcrumed to a suitable fitting 37 on a stationary support 37' which may be part of an airplane framework. The piston rod at its outer end journals a jockey pulley 38 engaging a cable 39 whose tension is to be regulated. The jockey pulley is located between pulleys 40 and 41 journalled on a stationary support 42 which may be part of the airplane framework. One end of the cable may extend to a control panel 43 for connection with a suitable control 44. The other end of the cable may extend a considerable distance through the airplane fuselage or wing for connection with a flight controlling member on the airplane, such as a rudder (not shown).

Cables are usually of metal such as steel, and where the airplane framework, through which the cable extends, is of metal such as aluminum, the difference in coefficients of expansion may result in considerable lengthening or shortening of the cable during temperature variation. When the tension regulator is installed for control of a cable, the piston is a distance out in the cylinder, usually near the center thereof, for contraction and loading of the springs 31 and 32 for the desired tension on the cable. Now, when the cable is idle, slackening of the cable due to temperature change will be comparatively slowly taken up by the expansion of the springs, and contraction of the cable during temperature variation will pull out the piston against the resistance of the springs. During such comparatively slow movement of the piston due to variation in length of the cable under temperature changes, the valve spring 34 will hold the valve disk 33 open for exposure of the flow gap 35 between the valve disk and the piston, so that oil may flow from one side of the piston to the other by way of the valve ports 26, and the resistance flow gaps 35 and 36. However, if the cable be pulled by operation of the control 44, such tensioning of the cable will tend to pull the piston out comparatively rapidly so that the oil in the outer part of the cylinder is put under pressure and will tend to flow through the gaps 36 and 35 and the valve ports 26 to the inner end of the cylinder. However, owing to the narrow restricted flow gap 36 between the valve disk and the cylinder, the oil flow will be immediately retarded and pressure will immediately build up behind the valve disk, and this pressure against the large exposed area of the valve will quickly seat it against the piston and shut off the flow gap 35. The outer portion of the cylinder is now closed and the piston is hydraulically locked against outward movement so long as tension is maintained on the cable by the operation of the control 44. The gap 36 between the valve disk and the cylinder being of such small dimension radially, capillary attraction will tend to maintain a film of oil between the disk and the cylinder tending to resist flow through the gap, and this capillary resistance, in addition to the small area of the gap, will quickly check flow through the gap so that substantially the instant that the piston starts to move outwardly when the pilot pulls the control 44, the valve disk will be shifted by the fluid to shut off the flow passage 35 for hydraulic locking of the piston against further outward movement. The pilot then has direct control of the cable and of the flight controlling element which is to be operated. As soon as the cable is released by the pilot, the springs 31, 32 will shift this piston back inwardly and the valve spring 34 will then shift the valve back to its open position against the piston rod flange 27.

The tension regulator can be associated with cables in various ways. Instead of anchoring the cylinder at one end and connecting the piston by a jockey pulley with the cable, as shown on Figure 1, the regulator could be included directly serially in a cable.

The volume of the oil in the cylinder may increase or decrease during temperature change, and the volumetric capacity of the cylinder may increase or decrease as the piston rod moves inwardly or outwardly in the cylinder. However, as the back and forth movement of the piston in the cylinder is comparatively very small when the regulator is in service, the inward or outward movement of the piston will not materially influence the oil displacement. The outer end of the cylinder is, of course, kept filled at all times with oil, and the volume of oil in the inner end of the cylinder should at all times be sufficient to cover the outer ends of the piston ports 26. For the inner end of the cylinder I provide a filler opening 45, this opening being normally closed by a plug 46. The plug has a vent passage 47 therethrough to the exterior so that as the volume of oil increases or decreases with the temperature, air may escape through the vent 47 or flow back therethrough into the cylinder. A filler opening 48 may also be provided at the outer end of the cylinder and normally held closed by a plug 49. The oil films in the flow gaps 35 and 36 act more or less like packing so that when the piston is at rest there will be no flow of oil from the outer end of the cylinder to the inner end thereof on account of difference in oil levels. Such film resistance is, of course, overcome when the piston moves and creates pressure or suction in the respective cylinder ends.

I have shown and described a practical and efficient embodiment of the features of my invention, but I do not desire to be limited to the exact construction, arrangement and operation shown and described as changes and modifications may be made without departure from the scope of the invention as defined in the appended claims.

What I claim is:

1. In aircraft, a tension regulator associated with a cable for maintaining predetermined tensioning thereof, comprising a closed cylinder connected with a support and filled with hydraulic fluid, a piston within the cylinder having a rod extending to the exterior thereof for connection with the cable to be tensioned, means preventing any flow between the cylinder and the piston a compression spring in the outer end of the cylinder for engaging said piston for tensioning of the cable to which the piston rod is connected, flow passageway through the piston for flow of fluid from one side to the other thereof, an abutment on said rod adjacent to the outer side of the piston, an annular valve surrounding the rod and movable thereon between said abutment and the outer side of the piston, a valve spring, the outer diameter of said valve being such as to leave only a restricted annular flow gap between the valve and the cylinder wall, said valve spring functioning to hold said valve against said abutment for flow through said gap and said piston passageway during comparatively slow and gradual movement of the piston, the flow resistance through said gap being such that when said piston, in response to operating pull on the cable, tends to move outwardly, the obstruction to flow through said gap from the outer end of the cylinder will cause pressure build up against the outer side of the valve for quick movement thereby against the resistance of the valve spring to shut off all flow from the outer end of the cylinder to the inner end thereof whereby the resulting hydraulic locking of the piston will prevent continued outward movement thereof.

2. A cable tensioning device for the purpose described comprising a closed cylinder filled with hydraulic fluid, a piston in the cylinder having a rod extending therefrom to the exterior, means preventing flow between said cylinder and said piston, a compression spring in the outer end of said cylinder resisting outward movement of the piston, passageway in said piston for flow of fluid from one side to the other thereof, an abutment on said rod adjacent to the outer side of the piston, an annular valve disk for said piston passageway disposed between said abutment and the outer ends of said passageway, a valve spring, the outer diameter of the valve disk being such that there will be only a restricted annular flow gap between the disk and the cylinder wall, said valve spring functioning to hold said valve disk open for exposure of the piston passageway and flow through said resistance gap during comparatively slow movement of the piston, but the flow resistance through said gap being such that, when the piston is started comparatively rapidly outwardly, the pressure in the outer end of the cylinder resulting from the checking of the flow through said gap will immediately shift the valve disk to shut off the piston flow passageways whereby the piston will then be hydraulically locked against continuing outward movement.

3. A cable tensioning device for the purpose described comprising a closed cylinder filled with hydraulic fluid, a packed piston structure for said cylinder including a rod extending therefrom to the exterior, a compression spring in the outer end of the cylinder resisting outward movement of the piston structure, said piston structure having passageways therethrough for flow between opposite ends of said cylinder, an abutment on said piston structure, an annular valve movable on said piston structure between said abutment and the outer ends of said passageway, a valve spring, the outer diameter of said valve being such that there will be only a restricted annular capillary flow gap between the valve periphery and the cylinder wall, said valve spring functioning to hold said valve open for exposure of the piston passageway and flow through said restricted gap during comparatively slow movement of the piston structure, but the flow resistance through said capillary gap being such that, when the piston is started comparatively rapidly outwardly, the pressure in the outer end of the cylinder resulting from the checking of the flow through said gap will immediately shift the valve to shut off the piston flow passageways whereby the piston structure will then be locked against continuing outward movement.

4. A cable tensioning device comprising a closed cylinder filled with hydraulic fluid, a piston in said cylinder having a rod extending therefrom to the exterior, a compression spring in the outer end of the cylinder resisting outward movement of the rod and piston, passageways through said piston for flow of fluid between the opposite ends of said cylinder, an abutment on said rod adjacent to the outer side of said piston, an annular valve disk shiftable on said rod between said abutment and the outer side of said piston, a valve spring for holding said valve against said abutment to leave a comparatively restricted gap therebetween and said piston, said valve disk exposing a large outer surface to the fluid in the outer end of said cylinder and being of such outer diameter that there will be only a restricted annular flow gap between the valve disk periphery and the cylinder wall, said valve functioning to hold said valve disk open for exposure of the piston passageways and flow through said resistance gaps during comparatively slow movement of the piston, but the flow resistance through said gaps being such that, when the piston is started comparatively rapidly outwardly, the pressure in the outer end of the cylinder resulting from the checking of the flow through said gaps will immediately shift the valve disk to shut off the piston flow passageways whereby the piston will then be hydraulically locked against continuing outward movement.

5. In an aircraft, a tension regulator for regulating the tension of a cable extending to a control in the aircraft, comprising a closed hydraulic fluid filled cylinder connected with a support, a packed piston within the cylinder having a rod extending therefrom to the exterior and engaging the cable to be regulated, a compression spring in the outer end of the cylinder in engagement with the piston rod tending to move the piston for tensioning of the cable, a flow passageway through the piston for flow of fluid from one side to the other thereof, an abutment on said rod adjacent to the outer side of the piston, an annular valve surrounding the rod and movable thereon between said abutment and the outer side of the piston, a valve spring functioning to hold said annular valve against said abutment for exposure of the passageway through the piston, said annular valve having a comparatively wide peripheral surface concentric with the cylinder wall and with the diameter such that only a narrow restricted capillary gap will be exposed between the valve surface and the cylinder wall, said valve spring being comparatively light and functioning to hold said valve open for flow through said annular gap and the piston passageway during comparatively slow and gradual movement of the piston, the flow resistance through said capillary gap being such that, when the piston is started outwardly by operating tension of the cable said capillary resistance will cause engagement of said valve with the piston for closure of the piston passageway and the establishment of a hydraulic lock against continuing outward movement of the piston.

6. A tension regulator for regulating the tension of a control operating cable in an airplane, comprising a closed hydraulic fluid filled cylinder, a packed piston structure in the cylinder having a rod extending therefrom to the exterior in engagement with the cable to be regulated, a compression spring in the outer end of the cylinder having engagement with the piston structure and tending to shift it inwardly for tensioning of the engaged cable, said piston structure having a passageway therethrough for flow between opposite ends of the cylinder, an abutment on the piston structure, a valve in the form of an annular plate movable on said piston structure between said abutment and the outer end of said passageway, a comparatively light valve spring tending to hold said valve plate against said abutment for exposure of said passageway, said valve plate peripheral surface being concentric with the inner face of said cylinder and said valve plate being comparatively thick and of such diameter as to leave only a restricted annular capillary gap between the plate and the cylinder, said valve spring functioning to hold said valve open for flow between the ends of said cylinder during slow and gradual movement of the piston structure in response to temperature variations in the controlled cable, the flow resistance through said capillary gap being such that, when said piston structure is displaced more rapidly outwardly by operating tension of the cable, pressure will immediately build up behind said valve plate in the outer end of the cylinder for substantially instant closure of said valve to establish a hydraulic lock against continuing outward movement of the piston structure.

VERNON A. TAUSCHER.